United States Patent

Asahara

[11] Patent Number: 5,917,864
[45] Date of Patent: Jun. 29, 1999

[54] AUTOMATIC FREQUENCY CONTROL CIRCUIT

[75] Inventor: Takashi Asahara, Tokyo, Japan

[73] Assignee: Mitsubishi Denki Kabushiki Kaisha, Tokyo, Japan

[21] Appl. No.: 08/858,488

[22] Filed: May 19, 1997

[30] Foreign Application Priority Data

Dec. 25, 1996 [JP] Japan .................................. 8-345827

[51] Int. Cl.⁶ .................................................. H04L 27/06
[52] U.S. Cl. ........................................... 375/344; 375/371
[58] Field of Search ............................. 455/164.1, 173.1, 455/182.2, 136, 192.1, 255, 256, 257, 258, 260; 375/344, 316, 362, 365, 371

[56] References Cited

U.S. PATENT DOCUMENTS

| 5,400,366 | 3/1995 | Iwamatsu | 375/97 |
| 5,418,815 | 5/1995 | Ishikawa et al. | 375/344 |
| 5,594,759 | 1/1997 | Iwamatsu | 375/344 |

FOREIGN PATENT DOCUMENTS 7183925  7/1995  Japan .

Primary Examiner—Jason Chan
Assistant Examiner—Jean B. Corrielus
Attorney, Agent, or Firm—Rothwell, Figg, Ernst & Kurz

[57] ABSTRACT

A signal from a differential detecting section is decoded by a data decision section and is inputted into a detection area judging section. In the detection area judging section, synchronous word patterns such as a unique word periodically inserted into the decoded data is detected, determination is made as to in which area the synchronous word pattern was detected, and in a case where it is judged by the capture determining section that frequency control is executed at an incorrect phase control point, a frequency deviation control section computes a control rate for a frequency deviation so that a detection area for the received signal will enter an area of a correct phase control point according to a detection area of the received signal, and the frequency deviation is corrected so that control is executed at the correct phase control point by adding a value corresponding to the control rate to an output value from the averaging filter section.

10 Claims, 14 Drawing Sheets

AUTOMATIC FREQUENCY CONTROL CIRCUIT

FIELD OF THE INVENTION

The present invention relates to an automatic frequency control circuit correcting frequency fluctuation due to deviation of frequency of a received signal or the Doppler effect therein or the like and tracking frequency fluctuation of received signals in digital modulation/demodulation used for satellite communications, mobile communications and mobile satellite communications.

BACKGROUND OF THE INVENTION

In recent years, active researches on digital modulation/demodulation have been made in the fields of satellite communications, mobile communications and mobile satellite communications. Especially in an environment for the mobile communications, a signal is generally received in a state where it has been subjected to heavy fading, and differential detection is more frequently used as compared to coherent detection for executing demodulation with stability even under the fading environment as described above. However, in the differential detection, there is such a defect that the performance is rapidly degraded if a received signal has a frequency deviation, so that the frequency deviation is necessary to be corrected, thus an automatic frequency control circuit being required.

Description is made for a conventional type of automatic frequency control circuit with reference to the related drawings.

FIG. 14 shows an example of configuration of the automatic frequency control circuit based on the conventional technology in a system to which a four-phase PSK modulated signal is used.

In the figure, designated at the reference numeral 10 is a phase rotating section, at 11a, 11b an LPF, at 12 a differential detecting section comprising an angle converting section 120 and a phase differential detecting section 121, at 13 a modulated component removing section, at 14 an averaging filter section, at 15 an integrator, and at 16 a coordinate transforming section.

Next description is made for operations. At first, received signals are down-converted and are subjected to quasi-coherent detection by a local oscillator with phases displaced by $\pi/2$ to be converted to Ich and Qch data each as a baseband signal. Baseband signals for the detected Ich and Qch data are inputted to the phase rotating section 10 and is subjected to phase rotation according to a signal for correcting a frequency deviation outputted from the coordinate transforming section 16. The baseband signal outputted from the phase rotating section 10 is filtered by the LPF sections 11a and 11b to be inputted in the differential detecting section 12, where the signal is converted to a phase data by the angle converting section 120, and then a phase differential detection between the present phase data and the phase data delayed by one symbol is executed by the phase differential detecting section 121, namely a phase difference therebetween is detected.

From the phase difference detected by the phase differential detecting section 121, modulated components of the baseband signal are removed by the modulated component removing section 13 and a phase rate rotated according to the frequency deviation in one symbol is detected. Signals outputted from the modulated component removing section 13 are averaged by the averaging filter section 14 for removing noise components or the like therefrom. The signal outputted from the averaging filter section 14 as described above indicates a phase rate obtained by being rotated according to the frequency deviation in one symbol, and assuming that a one-symbol delay rate of a received signal by differential detection is Ts, a phase difference after removal of the modulated components detected therefrom at the time is $\Delta\theta$ and a frequency deviation is $\Delta f$, the relation therebetween is expressed by the following equation, and a frequency deviation can be detected from the detected phase rate through this expression.

$$\Delta\theta = 2\pi \Delta f \, T_s$$

Signals outputted from the averaging filter section 14 are integrated by the integrator 15 for generating a signal for phase rotation. The signal obtained through integration by the integrator 15 is converted to cross signals by the coordinate transforming section 16 and inputted to the phase rotating section 10. Namely in the phase rotating section 10, a frequency deviation in a received signal can be corrected by rotating a phase against the received signal so that the detected frequency deviation will be canceled out.

By the way, in a case of the four-phase PSK modulation which is a modulating system often used in the satellite communications, mobile communications and mobile satellite communications or the like, a signal is required to be multiplied by 4 to remove modulated components from the received signal for detecting a frequency deviation therein.

For this reason, an area in which a frequency deviation can be detected from the received signal is restricted to within $\pm\frac{1}{8}$ of a symbol rate in a case where one-symbol delay is employed, so that it is impossible to sweep a received signal in a normal phase control point in the automatic frequency control circuit based on the conventional technology having the configuration as described above in a case where the frequency deviation exceeding $\pm\frac{1}{8}$ of the symbol rate is generated in the received signal.

Also in a case where a frequency deviation due to the Doppler fluctuation arises after the received signal is once captured, the automatic frequency control circuit will track the frequency deviation, but the frequency tracking area will be restricted according to the maximum value of the signal outputted from the averaging filter section. For this reason, in a case where the frequency deviation due to the Doppler fluctuation or the like exceeds the tracking area, the automatic frequency control circuit can not track the frequency deviation in the received signal.

SUMMARY OF THE INVENTION

It is an object of the present invention to provide an automatic frequency control circuit which can sweep a received signal in a normal phase control point even if there is a frequency deviation exceeding an area in which the received signal can be swept in the correct phase control point, and which can track the frequency deviation in the received signal even if the frequency deviation exceeds the tracking area of the averaging filter section.

With the present invention, determination is made as to whether the received signal could be captured at a correct phase control point or not by judging in which area the received signal was detected according to a synchronous word included in the received signal, and in a case where it is determined that said received signal was not correctly captured, a correction rate of said frequency deviation is controlled so that a detection area of the received signal matches a prespecified detection area, so that, even in a case where a frequency deviation exceeds a range in which the received signal can be swept in a correct phase control point, a frequency sweep-in range of an automatic frequency control circuit can substantially be expanded by sweeping in the correct phase control point in a simple way in which an output value from an averaging filter section is controlled by using a result of detection of a synchronous word by the detection area judging section.

With another feature of the present invention, a synchronous state of a received signal is determined, and in a case where it is judged that a synchronous state has been established and at the same time it is judged that a detected frequency deviation exceeds a prespecified maximum frequency deviation, the synthesizer is controlled so that the detected frequency deviation will not exceed the prespecified maximum frequency deviation, so that, even if a big frequency deviation uncontrollable by an automatic frequency control circuit is generated in the received signal due to the Doppler fluctuation or the like after a channel is captured, it is possible to track the frequency deviation by controlling the synthesizer, and a frequency tracking area of the automatic frequency control circuit can substantially be expanded. Also, a frequency deviation rate when frame synchronization is established and at the same time a synchronous word such as a unique word is detected is used, so that it is possible to prevent incorrect frequency control.

With another feature of the present invention, in a case where a channel with the frame synchronization thereof not having been established is captured, the function for capturing a channel is operated, and in a case where channel capturing has been established and also frame synchronization has been established, the function for tracking the channel is operated, so that a frequency sweep-in range of the automatic frequency control circuit can substantially be expanded in capturing a channel, and after a channel is captured, a frequency tracking range of the automatic frequency control circuit can be expanded.

Other objects and features of this invention will become understood from the following description with reference to the accompanying drawings.

DESCRIPTION OF THE PREFERRED EMBODIMENTS

Figure 1:
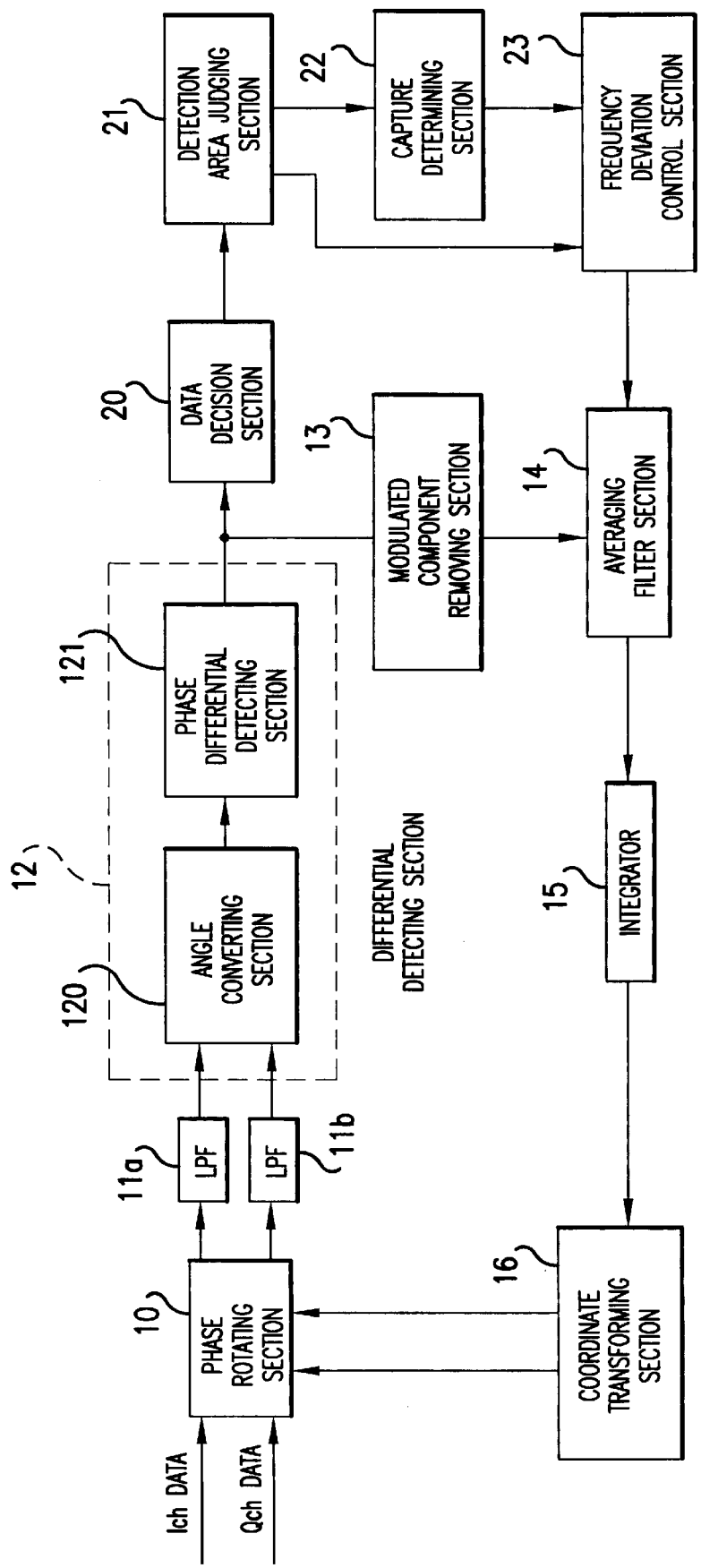
FIG. 1 shows an example of configuration of an automatic frequency control circuit according to Embodiment 1.

FIG. 1 shows an example of configuration of an automatic frequency control circuit according to Embodiment 1 in a system to which a four-phase PSK modulated signal is used. It should be noted that, in the following description, the same reference numerals are assigned to the sections corresponding to those in the automatic frequency control circuit based on the conventional technology.

In the figure, designated at the reference numeral 10 is a phase rotating section, at 11a, 11b an LPF, at 12 a differential detecting section comprising an angle converting section 120 and a phase differential detecting section 121, at 13 a modulated component removing section, at 14 an averaging filter section, at 15 an integrator, and at 16 a coordinate transforming section.

In the figure also, designated at the reference numeral 20 is a data decision section, at 21 a detection area judging section, at 22 a capture determining section, and 23 a frequency deviation control section.

Figure 2:
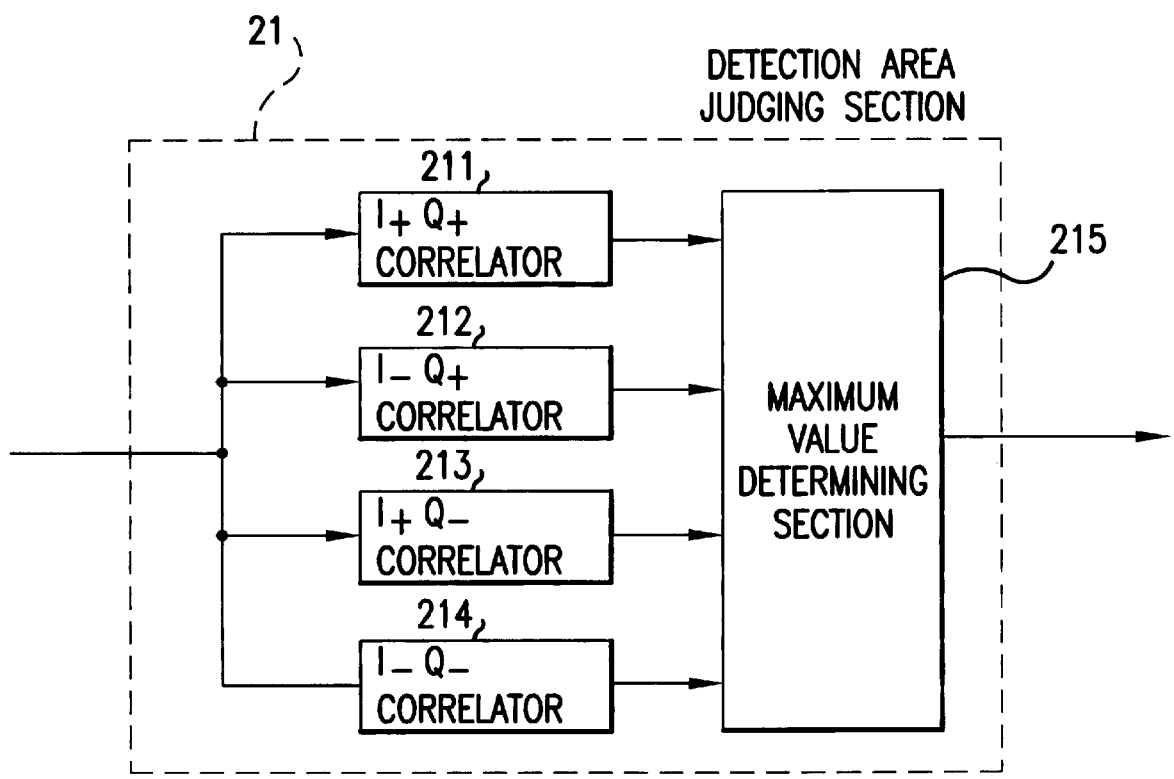
FIG. 2 shows an example of configuration of a detection area judging section according to Embodiment 1.

FIG. 2 shows an example of configuration of the detection area judging section 21. In the figure, designated at the reference numeral 211 is an $I_+Q_+$ correlator in which a correlation value becomes maximum in a case where the received signal is correlated with a synchronous word in the $I_+Q_+$ area which is an area of ±45° against the correct phase control point, at 212 an $I_-Q_+$ correlator in which a correlation value becomes maximum in a case where the received signal is correlated with a synchronous word in the $I_-Q_+$ area which is an area of ±45° against a phase control point with the phase displaced by +90° from the correct phase control point, at 213 an $I_+Q_-$ correlator in which a correlation value becomes maximum in a case where the received signal is correlated with a synchronous word in the $I_+Q_-$ area which is an area of ±45° against a phase control point with the phase displaced by −90° from the correct phase control point, at 214 an $I_-Q_-$ correlator in which a correlation value becomes maximum in a case where the received signal is correlated with a synchronous word in the $I_-Q_-$ area which is an area of ±45° against a phase control point with the phase displaced by ±180° from the correct phase control point, and at 215 a maximum value determining section for determining a maximum value of correlation value between each synchronous word pattern and output of the correlation value outputted from each of the correlators 211 to 214.

Figure 3:
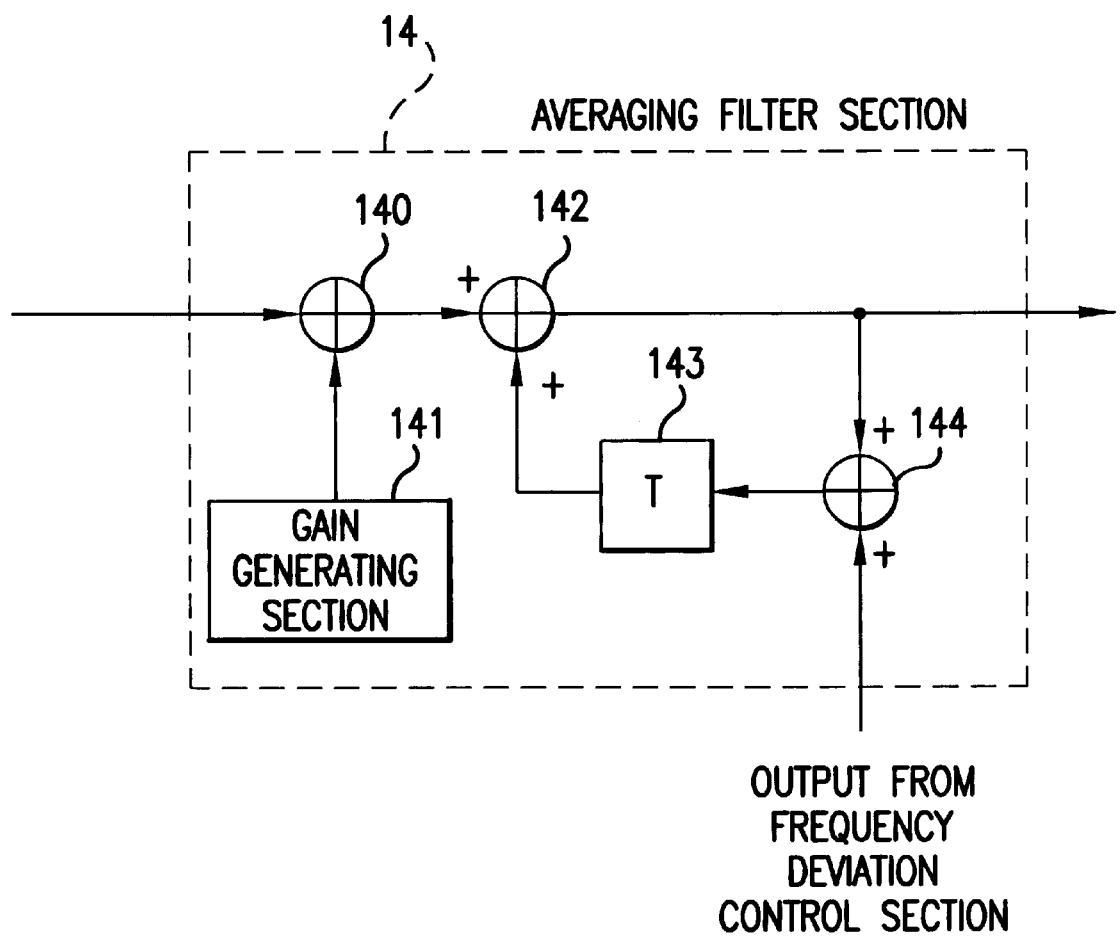
FIG. 3 shows an example of configuration of an averaging filter section according to Embodiment 1.

FIG. 3 shows an example of configuration of the averaging filter section 14. In the figure, designated at the reference numeral 140 is a multiplier, at 141 a gain generating section, at 142, 144 an adder, and at 143 a delay unit. This averaging filter section 14 constitutes a cyclic addition type of filter with very simple configuration.

Next description is made for operations. At first, received signals are down-converted and are subjected to quasi-coherent detection to be converted to Ich and Qch data each as a baseband signal. Baseband signals for the detected Ich and Qch data are inputted to the phase rotating section 10 and each phase thereof is rotated according to the control signal for correcting a frequency deviation outputted from the coordinate transforming section 16. The baseband signals outputted from the phase rotating section 10 are filtered by the LPF sections 11a and 11b and a phase difference therebetween is detected by the differential detecting section 12.

Namely, in the differential detecting section 12, the angle converting section 120 converts angles of the I and Q signals of the baseband filtered by the LPF sections 11a and 11b to phase data, and the phase differential detecting section 121 detects a phase difference between the present phase data and the phase data delayed by one symbol.

From the phase difference therebetween detected by the differential detecting section 12, a modulated component of the baseband signal is removed by the modulated component removing section 13. The signals outputted from the modulated component removing section 13 are averaged for removing noise components or the like by the averaging filter section 14. The signals outputted from the averaging filter section 14 are integrated by the integrator 15 for generating a signal for phase rotation. The signal obtained through integration by the integrator 15 is converted to cross signals by the coordinate transforming section 16 and inputted in the phase rotating section 10.

On the other hand, the signal outputted from the differential detecting section 12 is decoded by the data decision section 20 to decoded data and is inputted to the detection area judging section 21. In the detection area judging section 21, as shown in FIG. 2, the $I_+Q_+$ correlator 211, $I_-Q_+$ correlator 212, I+Q_ correlator 213, and I_Q_ correlator 214 correlate synchronous word patterns included in the transmitted area to the $I_+Q_+$ area, $I_-Q_+$ area, $I_+Q_-$, and $I_-Q_-$ area to output a correlation value with each other areas respectively, and then the maximum value determining section 215 determines from which of the correlators 211 to 214 the maximum correlation value was outputted, and also determines in which area the output was detected. Then the capture determining section 22 judges, as shown in FIG. 4, as to whether the detection area of the received signal matches a prespecified detection area or not and makes determination as to whether the received signal could be captured based on the correct phase control point or not.

Figure 4:
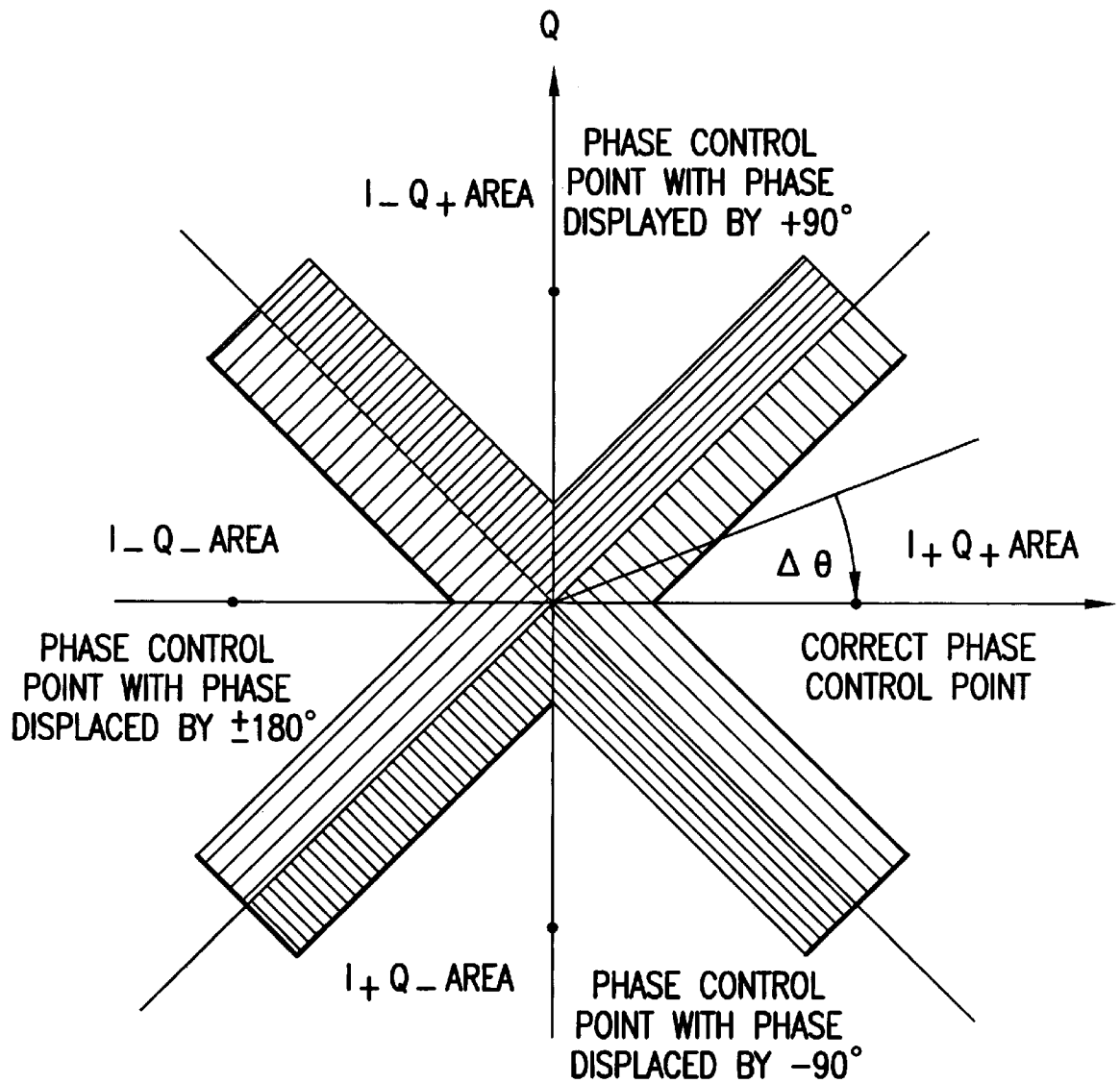
FIG. 4 shows an example of a determining area in a capture determining section according to Embodiment 1.

FIG. 4 shows an example of a determination area by the capture determining section 22.

More specifically, as shown in FIG. 4, in a case where a frequency deviation of the received signal is within ±⅛ of the symbol rate Ts, the received signal is supposed to be detected in the $I_+Q_+$ area, so that an output of the correlation value from the $I_+Q_+$ correlator 211 is maximum, which allows the automatic frequency control circuit to control a frequency at the correct phase control point. For this reason, in this case, the capture determining section 22 determines that the received signal could be received at the correct phase control point.

In contrast, in a case where a frequency deviation is not less than ±⅛ of the symbol rate Ts and the received signal is detected in any of the $I_-Q_+$ area, $I_+Q_-$ area, and $I_-Q_-$ area, the automatic frequency control circuit can not control a frequency at the correct phase control point because of removal of a modulated components by the modulated component removing section 13, which indicates that the frequency was controlled at an incorrect phase control point. And for this reason, the capture determining section 22 determines, in this case, that the frequency control is executed at an incorrect phase control point.

The frequency deviation control section 23 obtains, when the capture determining section 22 determines that frequency control is executed at an incorrect phase control point, a control rate of a frequency deviation for correcting so that a detection area of the received signal will be moved to an area with the correct phase control point based on the detection area of the received signal judged by the detection area judging section 21, and corrects the frequency deviation so that the control will be executed at the correct phase control point by adding a value corresponding to the control rate to an output value from the averaging filter section 14.

For instance, in a case where it is judged that the frequency control is executed at a control point with a phase displaced by +90° from the correct phase control point, the frequency deviation control section 23 corrects the output value from the averaging filter section 14 by a frequency control rate corresponding to −¼ of the symbol rate Ts so that the frequency control will be executed at the correct phase control point.

For the reasons as described above, correction can be made so that the frequency control will be executed at the correct phase control point because the averaging filter section 14 is a cyclic addition type of filter with simple configuration as shown in FIG. 3 and the frequency control rate corresponding to the correction rate of the frequency deviation is added to a result of the addition.

Accordingly, with the automatic frequency control circuit according to Embodiment 1, even if a received signal has any frequency deviation exceeding the area in which the received signal could be swept in the correct phase control point, it is possible that the received signal is swept in the correct phase control point in a simple way in which an output value from the averaging filter section 14 is controlled according to a result obtained by detecting a synchronous word in the detection area judging section 21, so that a frequency sweep-in area of the automatic frequency control circuit can actually be expanded.

It should be noted that, although a four-phase PSK modulation is assumed in description of Embodiment 1, even with an N-phase PSK modulation (N=2, 3, 8 etc.), the same object can be achieved.

Figure 5:
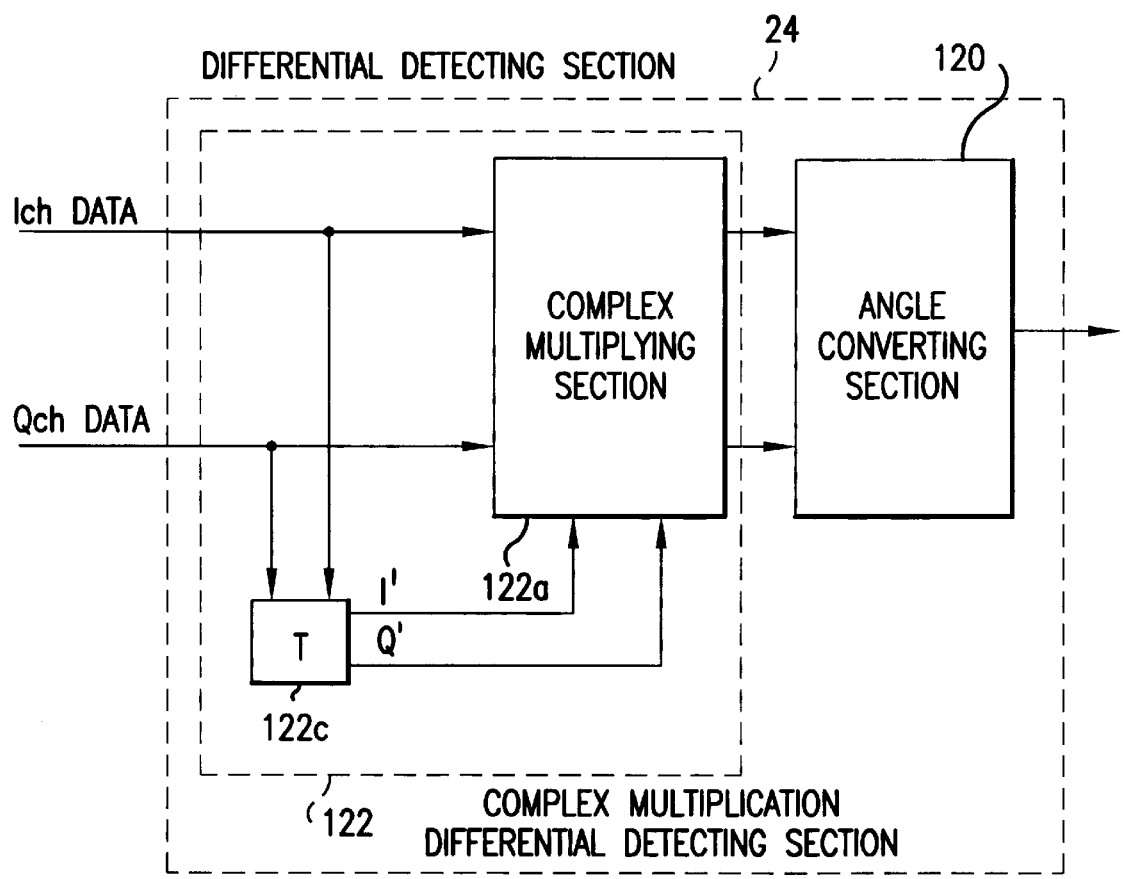
FIG. 5 shows an example of configuration of a differential detecting section in an automatic frequency control circuit according to Embodiment 2.

In Embodiment 1, the differential detecting section 12 has the configuration as shown in FIG. 1, but, in Embodiment 2, the differential detecting section has the configuration as shown in FIG. 5, and the other components therein are the same as those in Embodiment 1 shown in FIG. 1.

FIG. 5 shows configuration of a differential detecting section 24 according to Embodiment 2.

In the figure, the differential detecting section 24 according to Embodiment 2 executes angle conversion after a delay is detected according to complex multiplication, and in the differential detecting section 24, a complex multiplication differential detecting section 122 comprising a complex multiplying section 122a and a delay unit 122c is provided in an upstream section from the angle converting section 120.

Herein, computing processing in the complex multiplying section 122a of the complex multiplication differential detecting section 122 is as shown by the following Equation 1, and it is understood from the equation that a phase difference can be detected before an angle is converted. It should be noted that, in Equation 1, I indicates Ich data, Q indicates Qch data, I' and Q' indicate Ich data and Qch data each delayed by the delay unit 122c respectively, and θ and θ' indicate θ=tan⁻¹ (Q/I) and θ'=tan⁻¹ (Q'/I') respectively.

$$(I+jQ)(I'+jQ')^* = \sqrt{I^2+Q^2}\, e^{j\theta} \cdot \left(\sqrt{I'^2+Q'^2}\, e^{j\theta'}\right)^*$$

$$= \sqrt{I^2+Q^2}\, e^{j\theta} \cdot \left(\sqrt{I'^2+Q'^2}\, e^{-j\theta'}\right)$$

$$= \sqrt{I^2+Q^2}\, \sqrt{I'^2+Q'^2}\, e^{j(\theta-\theta')}$$

Then, after a phase difference is detected, the angle converting section 120 converts the detected phase difference to an angle, so that an output from the differential detecting section 24 in Embodiment 2 is the same as that from the differential detecting section 12 in Embodiment 1, and the same effect as that in Embodiment 1 can be obtained because the configuration excluding the component described above is the same as that in Embodiment 1.

Figure 6:
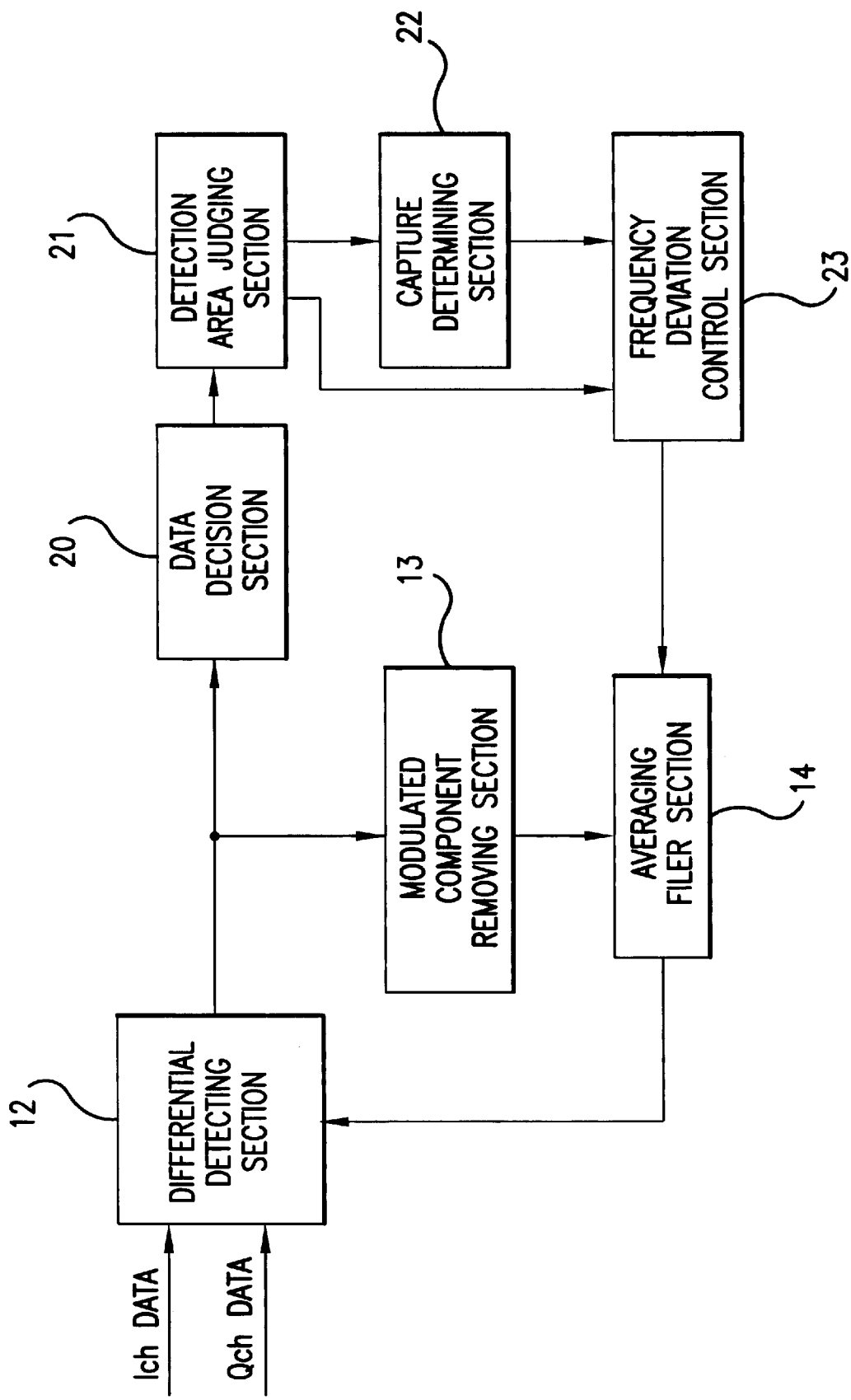
FIG. 6 shows an example of configuration of an automatic frequency control circuit according to Embodiment 3.

FIG. 6 shows an example of configuration of an automatic frequency control circuit according to Embodiment 3 in the system to which the four-phase PSK modulated signal is used. In the automatic frequency control circuit according to Embodiment 3, an output from the averaging filter section 14 is directly inputted to the differential detecting section 12. For this reason, the configuration is different from that of the automatic frequency control circuit according to Embodiment 1 shown in FIG. 1 in that the integrator 15, coordinate transforming section 16 and phase rotating section 10 are removed from the latter, and the other components are the same as those in Embodiment 1 shown in FIG. 1.

Figure 7:
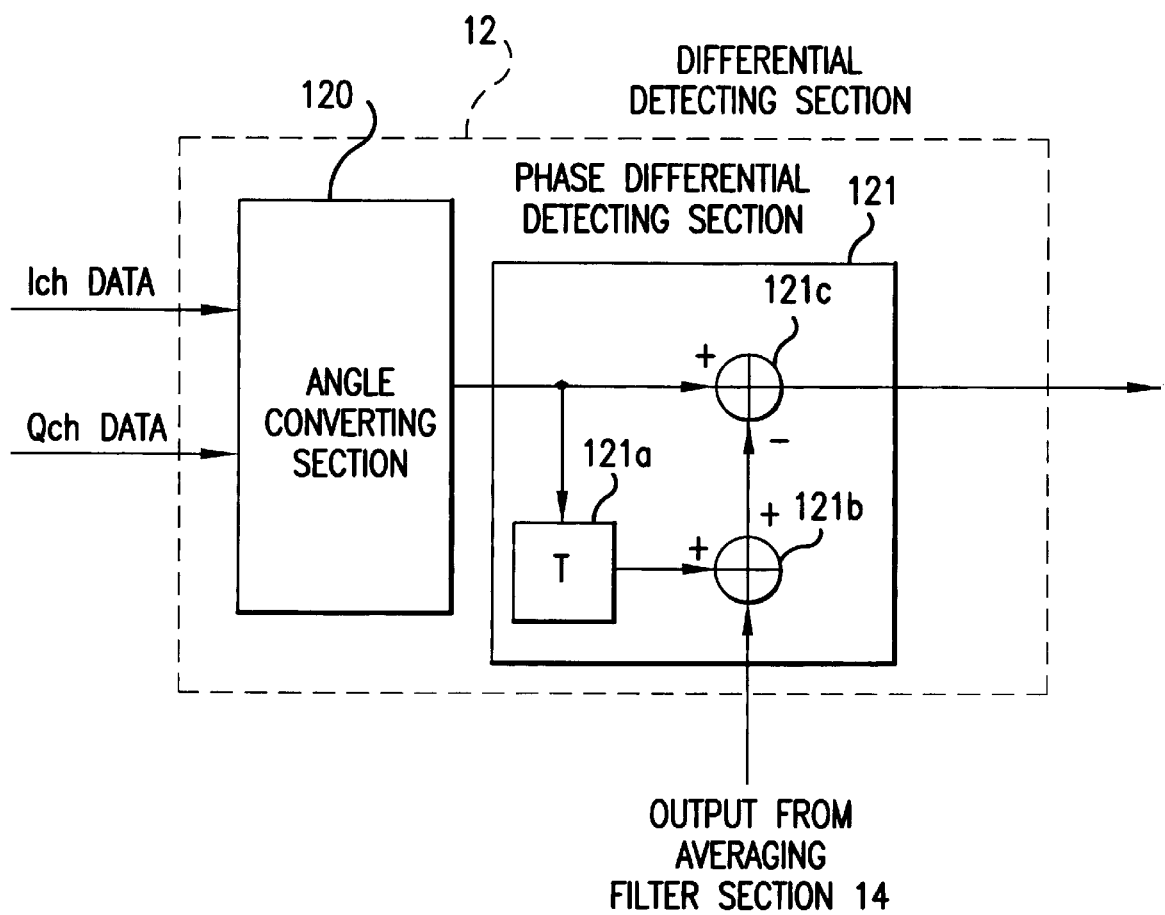
FIG. 7 shows an example of configuration of a differential detecting section in an automatic frequency control circuit according to Embodiment 3.

FIG. 7 shows configuration of a differential detecting section 12 according to Embodiment 3. In the figure, the reference numeral 120 indicates an angle converting section and the reference numeral 121 indicates a phase differential detecting section, and the configuration of the phase differential detecting section 121 is shown in detail therein for showing an destination of an output from the averaging filter section 14 although the components described above constituting the differential detecting section 12 are the same as those in Embodiment 1 and those based on the conventional technology. Namely, the phase differential detecting section 121 comprises the delay unit (T) 121a, an adder 121b, and a subtracter 121c so that an output from the averaging filter section 14 is inputted to the adder 121b.

Accordingly, with Embodiment 3, a frequency deviation is modified, different from Embodiment 1, to a signal delayed by the delay unit 121a in the phase differential detecting section 121 of the differential detecting section 12, but like in Embodiment 1, even if a received signal has any frequency deviation exceeding the area in which the received signal can be swept in the correct phase control point, the received signal can be swept in the correct phase control point in a simple way in which an output value from the averaging filter section 14 is controlled, so that a frequency sweep-in area of the automatic frequency control circuit can substantially be expanded Also with Embodiment 3, the components such as the integrator 15, coordinate transforming section 16 and phase rotating section 10 each required for the automatic frequency control section according to Embodiment 1 are eliminated herein, which makes it possible to reduce cost by decreasing the number of components as compared to the case of Embodiment 1.

An automatic frequency control circuit according to Embodiment 4 has the configuration in which an output from the averaging filter section 14 is directly inputted to the differential detecting section like in Embodiment 3 described above, but configuration of the differential detecting section is different from that in Embodiment 3. It should be noted that the components other than the differential detecting section therein are the same as those in the automatic frequency control circuit according to Embodiment 3 shown in FIG. 6, so that description is only made for the configuration of the differential detecting section.

Figure 8:
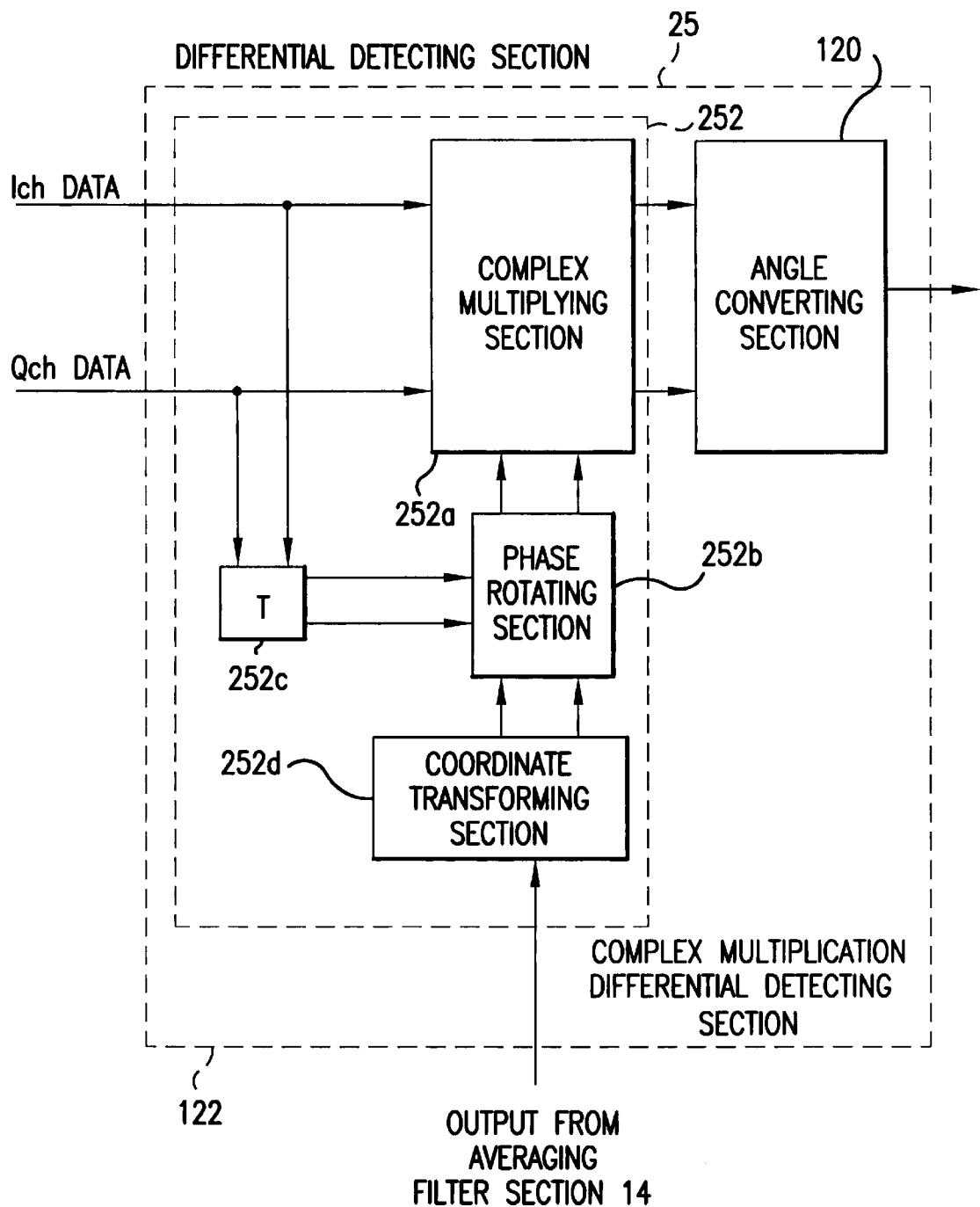
FIG. 8 shows an example of configuration of a differential detecting section in an automatic frequency control circuit according to Embodiment 4.

FIG. 8 shows configuration of a differential detecting section 25 according to Embodiment 4. In the figure, the differential detecting section 25 according to Embodiment 4 converts an angle after a delay is detected according to complex multiplication, and in the differential detecting section 25 according to Embodiment 4, a complex multiplication delay detecting section 252 comprising a complex multiplying section 252a, a phase rotating section 252b, a delay unit (T) 252c, and a coordinate transforming section 252d is provided in an upstream section from the angle converting section 120, and an output from the averaging filter section 14 is inputted to the coordinate transforming section 252d of the complex multiplication differential detecting section 252.

Next description is made for operations. In Embodiment 1, an output from the averaging filter section 14 is inputted, as shown in FIG. 1, to the phase rotating section 10 via the integrator 15 and the coordinate transforming section 16, but, in Embodiment 4, an output from the averaging filter section 14 is inputted, as shown in FIG. 8, to the coordinate transforming section 252d of the complex multiplication delay detecting section 252 in the differential detecting section 25, and is converted to Ich and Qch data by transforming coordinates to be inputted to the phase rotating section 252b. The phase rotating section 252b corrects Ich and Qch data delayed by the delay unit 252c and the frequency deviation obtained by transforming the coordinate based on the frequency deviation from the averaging filter section 14 so that the frequency deviation will be canceled out like in the phase rotating section 10 according to Embodiment 1 to be outputted.

Then, the complex multiplying section 252a obtains a phase difference between the Ich and Qch data by complex-multiplying the Ich and Qch data respectively, like in Embodiment 2, based on the received Ich and Qch data as well as the delayed Ich and Qch data each of which frequency deviation is canceled out from the phase rotating section 252b, and the angle converting section 120 converts an angle based on the Ich and Qch data. For this reason, the same effect as that in Embodiments 1 to 3 can be obtained.

Figure 9:
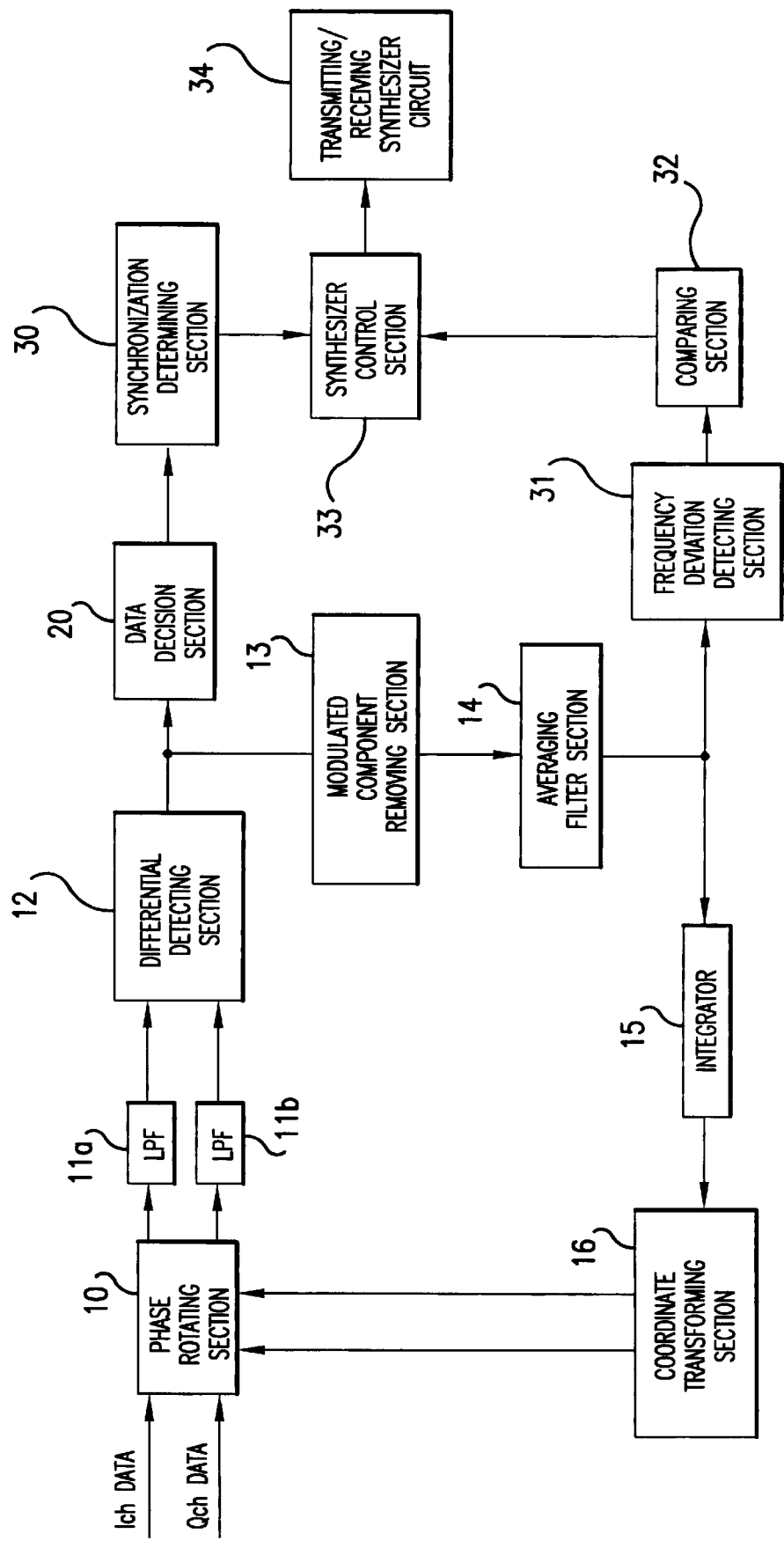
FIG. 9 shows an example of configuration of an automatic frequency control circuit according to Embodiment 5.

FIG. 9 shows an example of configuration of an automatic frequency control circuit according to Embodiment 5 in the system to which the four-phase PSK modulated signal is used. In the figure, designated at the reference numeral 30 is a synchronization determining section, at 31 a frequency deviation detecting section, at 32 a comparing section, at 33 a synthesizer control section, at 34 a transmitting/receiving synthesizer circuit, and the other components therein are the same as those in Embodiment 1, so that the same reference numerals are assigned to the sections corresponding to those in Embodiment 1 and description thereof is omitted herein.

Next description is made for operations. At first, received signals are down-converted and are subjected to quasi-coherent detection to be converted to Ich and Qch data each as a baseband signal. Baseband signals of the detected Ich and Qch data are inputted to the phase rotating section 10 and each phase thereof is rotated by the control signal for correcting a frequency deviation outputted from the coordinate transforming section 16. The baseband signals outputted from the phase rotating section 10 are filtered by the LPF sections 11a and 11b and a phase difference therebetween is detected by the differential detecting section 12. From the phase difference therebetween detected by the differential detecting section 12, a modulated component of the baseband signal is removed by the modulated component removing section 13. The signals outputted from the modulated component removing section 13 are averaged for removing noise components or the like therefrom by the averaging filter section 14. The signals outputted from the averaging filter section 14 are integrated by the integrator 15 for generating a signal for phase rotation. The signal obtained through integration by the integrator 15 is converted to cross signals by the coordinate transforming section 16 to be inputted in the phase rotating section 10.

On the other hand, the signal outputted from the differential detecting section 12 is decoded by the data decision section 20 to decoded data. As for the output signal from the data decision section 20, the synchronization determining section 30 detects a synchronous word pattern such as a unique word or the like cyclically inserted into the decoded data, determines a state of frame synchronization according to a result of detection of the synchronous word, and outputs a result of the determination to the synthesizer control section 33. The frequency deviation detecting section 31 detects a frequency deviation according to an output from the averaging filter section 14, and the frequency deviation detected by the frequency deviation detecting section 31 is inputted to the comparing section 32, where it is compared to a preset threshold value.

The synthesizer control section 33 controls a state of the transmitting/receiving synthesizer circuit 34 according to a frame synchronous state determined as a result of synchronous word detection by the synchronization determining section 30 as well as to a result of comparison outputted from the comparing section 32.

Figure 10:
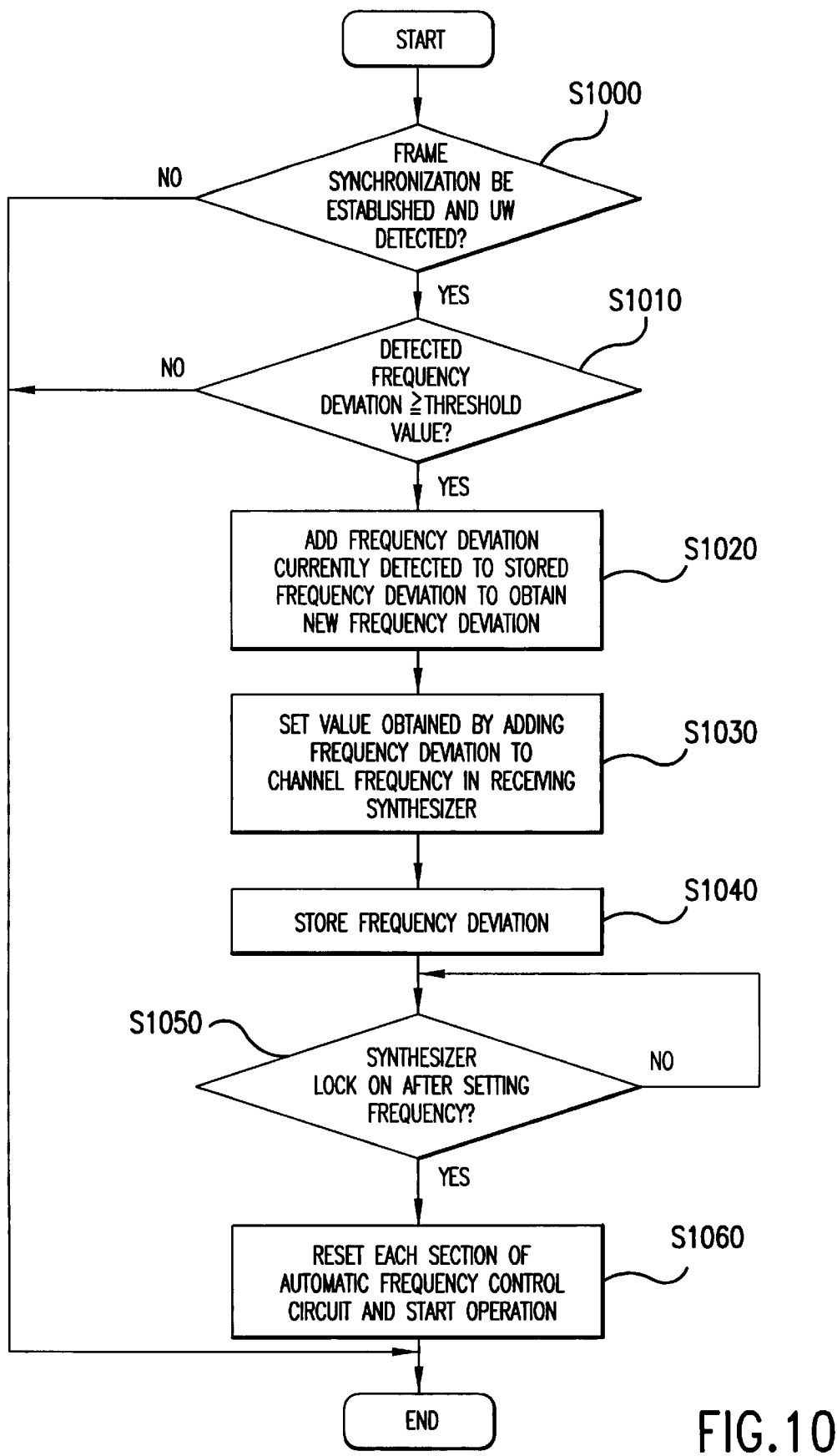
FIG. 10 shows an example of an operation flow in received frequency control according to Embodiment 6.

FIG. 10 shows an example of an operation flow in the received frequency control processing according to Embodiment 5. To describe the operations with reference to the operation flow, at first, in a case where it is determined by the synchronization determining section 30 that frame synchronization has been established, any unique word (UW) is detected (step 1000 "YES"), and further it is judged from a result of comparison provided by the comparing section 32 concerning a difference between the frequency deviation detected by the frequency deviation detecting section 31 and the threshold value that the detected frequency deviation has exceeded the threshold value of the frequency deviation controllable by the automatic frequency control circuit (step 1010 "YES"), the synthesizer control section 33 executes the following operations.

Namely, the synthesizer control section 33 adds, at first, the frequency deviation detected last to the stored frequency deviation to obtain a new frequency deviation (step 1020), sets the frequency deviation displaced by the last-computed frequency deviation against the channel frequency in the transmitting/receiving synthesizer circuit 34 (step 1030), and stores the last-computed frequency deviation in the memory or the like (step 1040).

Then, the synthesizer control section 33 sets a frequency in the transmitting/receiving synthesizer circuit 34, checks whether the frequency is locked on by the synthesizer or not (step 1050), and in a case where it is confirmed that the frequency has been locked on (step 1050 "YES"), the synthesizer control section 33 resets each section of the automatic frequency control circuit thereafter, and starts again the operations for automatic frequency control (step 1060).

Accordingly, with Embodiment 5, even if a large frequency deviation uncontrollable by the automatic frequency control circuit is generated in the received signal due to the Doppler fluctuation after the channel is captured, the synthesizer control section 33 controls the transmitting/receiving synthesizer circuit 34 so that such large frequency deviation will be eliminated, whereby the automatic frequency control circuit can track the frequency deviation and a frequency tracking area of the automatic frequency control circuit can substantially be expanded.

Also the possibility of incorrect control of a frequency can be reduced because the frequency deviation when frame synchronization has been established and a synchronous word such as a unique word or the like has been detected is used.

It should be noted that, in Embodiment 5, the phase rotating section 10 is provided in the front stage of the LPF sections 11a and 11b, and an output from the averaging filter section 14 is fed back to the phase rotating section 10 through the integrator 15 and coordinate transforming section 16, but like in Embodiment 3 shown in FIG. 6 and FIG. 7 and in Embodiment 4 shown in FIG. 8, the automatic frequency control circuit may employ configuration so that an output from the averaging filter section 14 is fed back to the differential detecting section 12.

In Embodiment 6, configuration of the automatic frequency control circuit is equivalent to that in Embodiment 5 shown in FIG. 9 except the fact that only control processing of the transmitting/receiving synthesizer circuit 34 by the synthesizer control section 33 is different therefrom, so that description is made mainly for synthesizer control processing in the synthesizer control section based on the configuration according to Embodiment 5 shown in FIG. 9.

Figure 11:
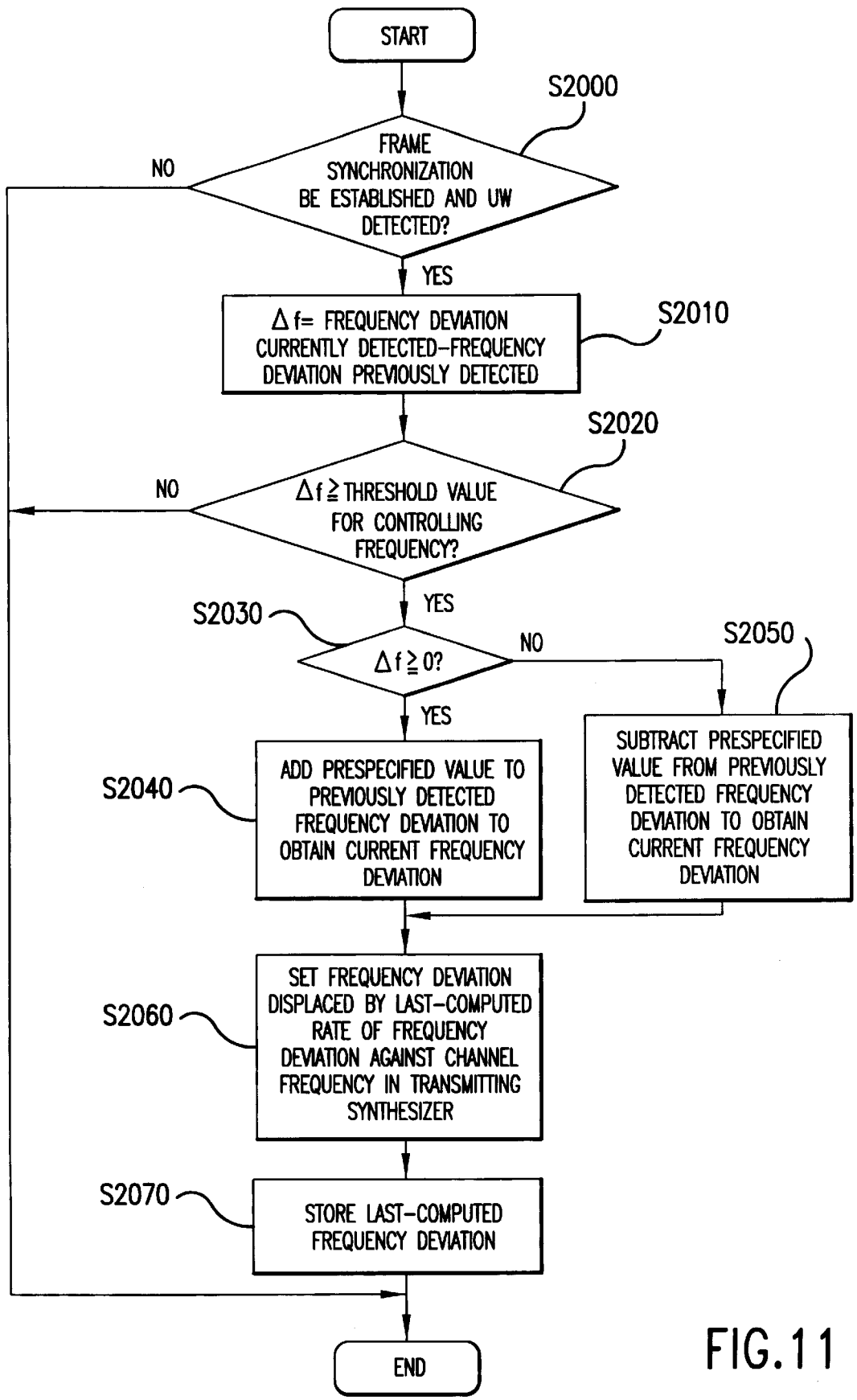
FIG. 11 shows an example of an operation flow in transmitted frequency control according to Embodiment 6.

FIG. 11 shows an example of an operation flow in the transmitting frequency control processing according to Embodiment 6. To describe the operations with reference to the operation flow, in a case where it is determined by the synchronization determining section 30 that frame synchronization has been established and any unique word has been detected (step 2000 "YES"), at first the comparing section 32 further computes a difference between the frequency deviation currently detected by the frequency deviation detecting section 31 and the stored and previously detected frequency deviation (step 2010), and the synthesizer control section 33 determines whether a result of computation ($\Delta F$) exceeds the prespecified threshold value for controlling a frequency or not (step 2020).

Herein, the synthesizer control section 33 makes determination, in a case where it is determined that the result of computation ($\Delta F$) by the comparing section 30 has exceeded the prespecified threshold value for controlling a frequency (step 2020 "YES"), as to whether the result of computation ($\Delta F$) is positive or not (step 2030), and when it is determined that the result of computation ($\Delta F$) is positive (step 2030 "YES"), the synthesizer control section 33 adds the prespecified value corresponding to the frequency deviation to the stored and previously detected frequency deviation, and uses the value obtained by addition as a current frequency deviation (step 2040).

On the other hand, in a case where it is determined that the result of computation ($\Delta F$) is negative (step 2030 "NO"), the synthesizer control section 33 subtracts a prespecified value corresponding to the prespecified frequency deviation from the stored and previous detected frequency deviation, and uses the value obtained by subtraction as a current frequency deviation (step 2050).

Then, in both of the cases, the synthesizer control section 33 sets a frequency deviation displaced by the last-computed rate of frequency deviation against the channel frequency in the transmitting/receiving synthesizer circuit 34 (step 2060), and stores the last-computed frequency deviation in the memory or the like (step 2070).

Accordingly, with Embodiment 6, like in Embodiment 5, even if a large frequency deviation uncontrollable by the automatic frequency control circuit is generated in the received signal due to the Doppler fluctuation after the channel is captured, the synthesizer control section 33 controls the transmitting/receiving synthesizer circuit 34 so that such large frequency deviation will be eliminated, whereby the automatic frequency control circuit can track the frequency deviation and can have a frequency of the transmitted signal track according to frequency fluctuation of the received signal due to the Doppler fluctuation.

The possibility of incorrect control of a frequency can also be reduced because the frequency deviation when frame synchronization has been established and a synchronous word such as a unique word or the like has been detected is used, and excessive control due to dispersion of the detected frequency deviation affected by noises or the like can also be prevented because a threshold value is provided in the comparing section 32.

Furthermore, since a frequency step width to be controlled is set to a constant value, it is possible to avoid excessive control of a frequency by taking into consideration the frequency step width.

Figure 12:
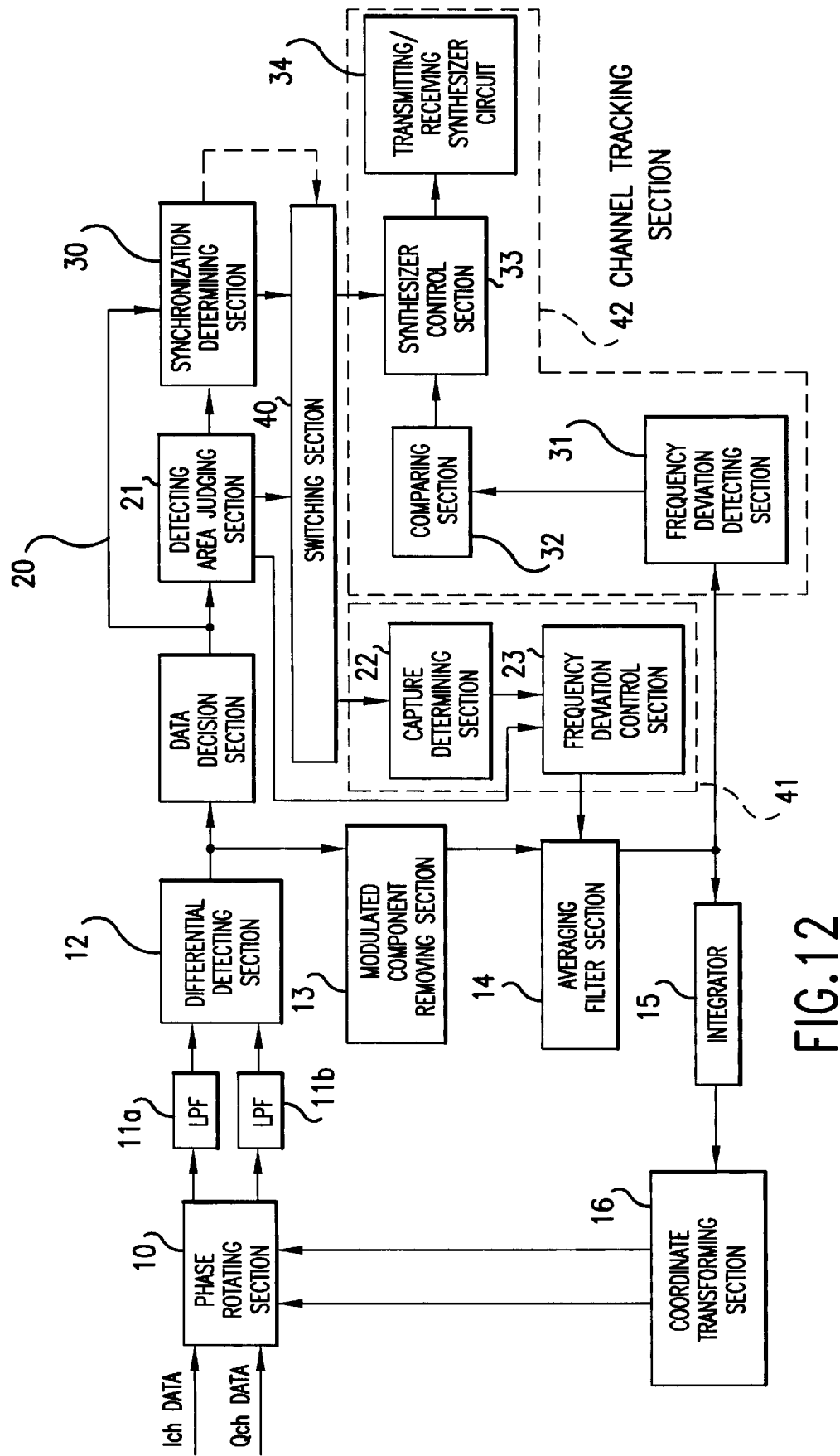
FIG. 12 shows an example of configuration of an automatic frequency control circuit according to Embodiment 7.

FIG. 12 shows an example of configuration of an automatic frequency control circuit according to Embodiment 7 in the system to which the four-phase PSK modulated signal is used. In the figure, designated at the reference numeral 40 is a switching section, at 41 a channel capturing section comprising the capture determining section 22 and frequency deviation detecting section 23, and at 42 a channel tracking section comprising the frequency deviation detecting section 31, comparing section 32, synthesizer control section 33 and transmitting/receiving synthesizer circuit 34, and the other components therein are the same as those shown in FIG. 1 and FIG. 9, so that the same reference numerals are assigned to the sections corresponding to those shown in FIG. 1 and FIG. 9.

Figure 13:
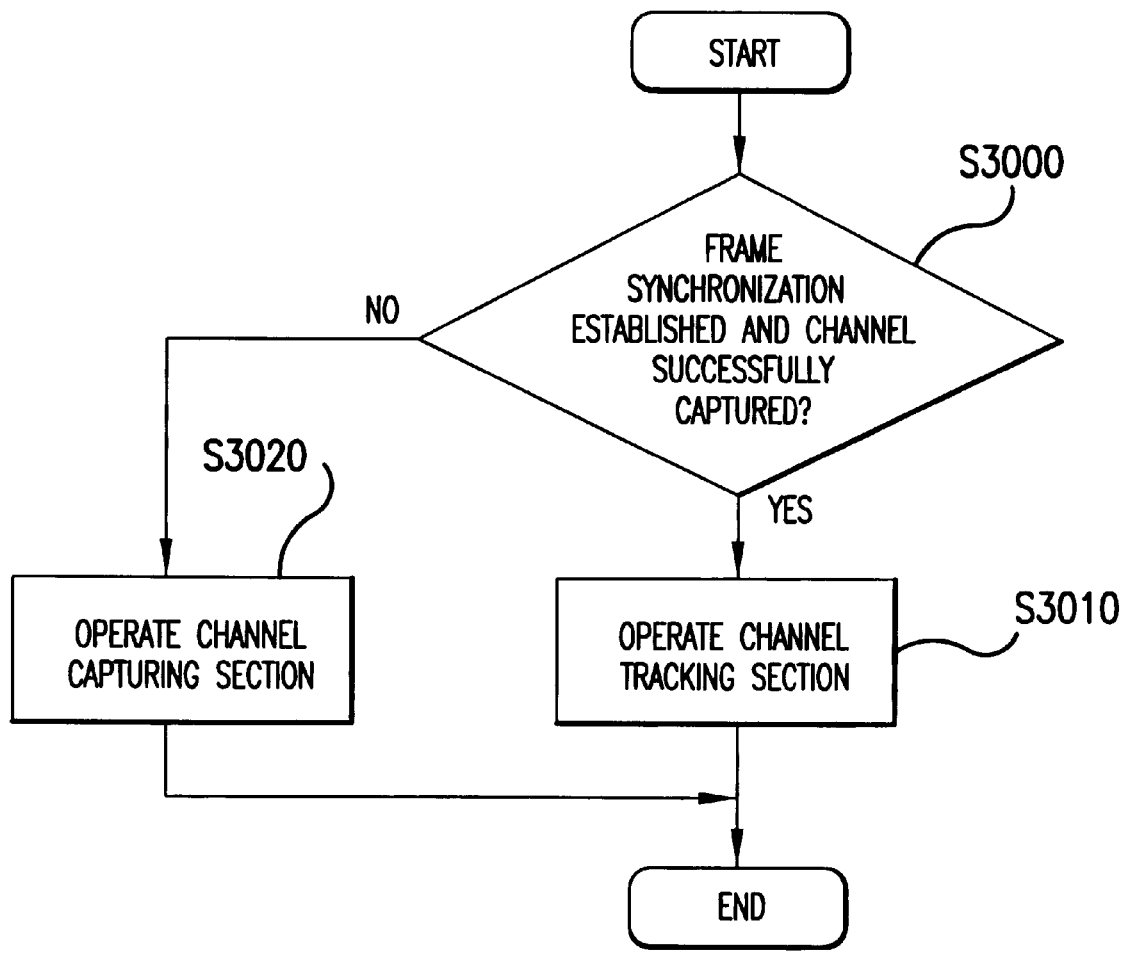
FIG. 13 shows an example of an operation flow in an automatic frequency control circuit according to Embodiment 7.
Figure 14:
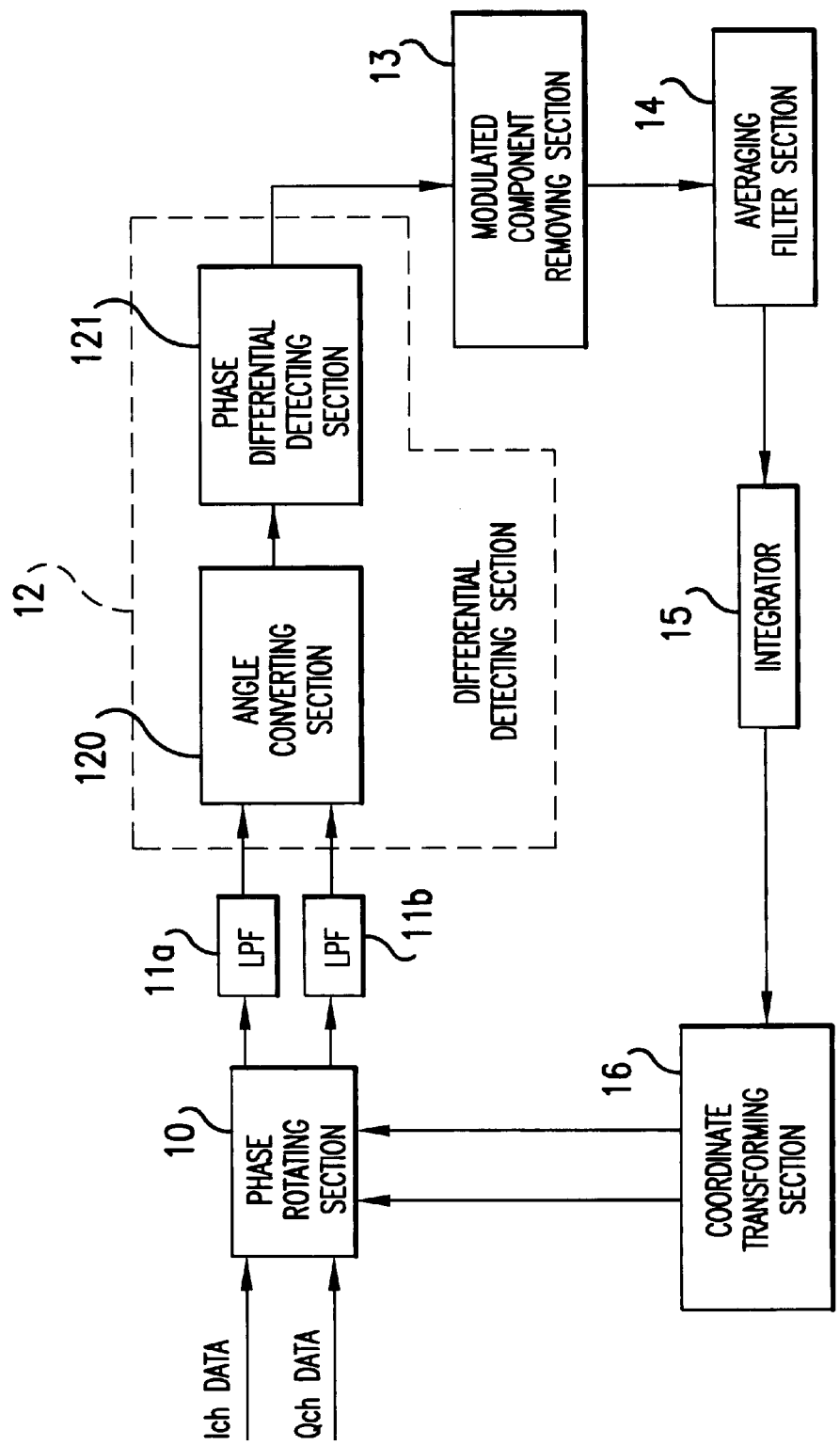
FIG. 14 shows an example of configuration of an automatic frequency control circuit according to the conventional technology.

FIG. 13 shows an example of an operation flow indicating a state transition in the frequency control according to the embodiment. To describe the operations with reference to the operation, at first, determination is made by the synchronization determining section 30 as to whether the current state is a frame synchronous state or not, namely as to whether frame synchronization has been established and a channel has successfully been captured or not (step 3000). Herein, in a case where it is determined that the frame synchronization has not been established (step 3000 "NO"), the switching section 40 switches to the side of the channel capturing section 41 and makes the capture determining section 22 as well as the frequency deviation control section 23 each constituting the channel capturing section 41 operate like in Embodiment 1 or the like (step 3020), and in a case where it is determined that the frame synchronization has been established (step 3000 "YES"), the switching section 40 switches to the side of the channel tracking section 42 and makes the frequency deviation detecting section 31, comparing section 32, synthesizer control section 33 and transmitting/receiving synthesizer circuit 34 each constituting the channel tracking section 42 operate like in Embodiments 5 and 6 (step 3010).

Accordingly, with Embodiment 7, the switching section 40 makes the function of channel capturing operate in a case where a channel with the frame synchronization thereof not having been established is captured, and makes the function of channel tracking operate in a case where the channel capturing has been established and also the frame synchronization has been established, whereby a frequency sweep-in area of the automatic frequency control circuit can be expanded at the time of channel capturing and a frequency tracking area of the automatic frequency control circuit can be expanded after the channel is captured.

It should be noted that, although, in Embodiment 7, the phase rotating section 10 is provided in the front stage of the LPF sections 11a and 11b and an output from the averaging filter section 14 is fed back to the phase rotating section 10 through the integrator 15 and coordinate transforming section 16, like in Embodiment 3 shown in FIG. 6 and FIG. 7 as well as in Embodiment 4 shown in FIG. 8, the automatic frequency control circuit may employ configuration so that an output from the averaging filter section 14 is fed back to the differential detecting section 12.

This application is based on Japanese patent application No. HEI 8-345827 filed in the Japanese Patent Office on Dec. 25, 1996, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An automatic frequency control circuit for detecting a phase difference of a received signal from a signal delayed by a certain period of time from the received signal and correcting frequency deviation of said received signal against a transmitted signal according to a signal based on an average of the phase differences comprising:

a detection area judging section for judging in which area the received signal was detected according to a synchronous word included in said received signal;

a capture determining section for determining whether said received signal was captured at a correct phase control point based on the detection area of the received signal judged by said detection area judging section; and a frequency deviation control section for controlling a correction rate of said frequency deviation, in a case where it is determined by said capture determining section that said received signal was not correctly captured, so that the detection area of said received signal matches a prespecified detection area.

2. An automatic frequency control circuit according to claim 1, wherein in a differential detecting section for detecting said phase difference, an angle converting section converts angles of baseband signals to phase data, and a phase differential detecting section detects a phase difference between said present phase data and the phase data delayed by one symbol.

3. An automatic frequency control circuit according to claim 1, wherein an averaging filter section for averaging said phase difference constitutes a cyclic addition type of filter.

4. An automatic frequency control circuit according to claim 2, wherein said phase differential detecting section comprises a delay unit, an adder and a subtracter, so that an output from said averaging filter section is inputted to said adder, a frequency deviation is modified to a signal delayed by said delay unit.

5. An automatic frequency control circuit according to claim 2, wherein said differential detecting section having a complex multiplication delay detection section comprising a complex multiplying section and a delay unit is provided in an upstream section from said angle converting section.

6. An automatic frequency control circuit according to claim 2, wherein s-aid differential detecting section converts an angle after a delay is detected according to complex multiplication, and a complex multiplication differential detecting section comprising a complex multiplying section, a phase rotating section, delay unit and a coordinate transforming section is provided in an upstream section from said angle converting section, and an output from an averaging filter section is inputted to said coordinate transforming section.

7. An automatic frequency control circuit according to claim 2, wherein said detection area judging section comprises plural correlators in which a correlation value is different, and a maximum value determining section for determining a maximum value of correlation value between each synchronous word pattern and output of the correlation value outputted from each of said correlators.

8. An automatic frequency control circuit according to claim 1, wherein said frequency deviation control section obtains, when said capture determining section determines that frequency control is executed at an incorrect phase control point, a control rate of a frequency deviation for correcting so that a detecting area of the received signal will be moved to an area with the correct phase control point based on the detecting area of the received signal judged by said detection area judging section, and corrects the frequency deviation so that the control will be executed at the correct phase control point by adding a value corresponding to the control rate to an output value from an averaging filter section.

9. An automatic frequency control circuit for detecting a phase difference of a received signal from a signal delayed by a certain period of time from the received signal, correcting a frequency deviation of said received signal from a transmitted signal according to a signal based on an average of the phase differences, and controlling an oscillation frequency of a synthesizer comprising:

a frequency deviation detecting section for detecting said frequency deviation;

a comparing section for comparing the frequency deviation detected by said frequency deviation detecting section to a prespecified maximum frequency deviation;

a synchronization determining section for detecting a synchronous word included in said received signal and determining a synchronous state according to a result of determination; and a synthesizer control section for controlling said synthesizer, in a case where it is judged by said synchronization determining section that a synchronous state has been effected and at the same time it is judged by said comparing section that said detected frequency deviation exceeds said prespecified maximum frequency deviation, so that said detected frequency deviation will not exceed said prespecified maximum frequency deviation.

10. An automatic frequency control circuit according to claim 9 further comprising:

a capture determining section for determining whether said received signal was captured at a correct phase control point according to a detection area of the received signal judged by a detection area determining section or not;

a frequency deviation control section for controlling, in a case where it is determined by said capture determining section that said received signal was not correctly captured, a correction rate for said frequency deviation so that the detection area of said received signal will match to a prespecified detection area;

a synchronization determining section for detecting a synchronous word included in said received signal and determining whether a synchronous state has been established or not; and a switching section for having said capture determining section make determination to make said frequency deviation control section operate in a case where it is determined by said synchronization determining section that a synchronous state has not been established, and also for having said comparing section execute comparison to make the synthesizer control section operate in a case where it is determined that a synchronous state has been established.

* * * * *